(12) United States Patent
Elnar

(10) Patent No.: US 9,362,740 B1
(45) Date of Patent: Jun. 7, 2016

(54) ELECTRICAL WATER HEATER AIR ENTRAPMENT DETECTION

(71) Applicant: Joseph G. Elnar, Riverside, CA (US)

(72) Inventor: Joseph G. Elnar, Riverside, CA (US)

(*) Notice: Subject to any disclaimer, the term of this patent is extended or adjusted under 35 U.S.C. 154(b) by 186 days.

(21) Appl. No.: 14/174,070

(22) Filed: Feb. 6, 2014

(51) Int. Cl.
*H05B 1/02* (2006.01)
*H02H 11/00* (2006.01)

(52) U.S. Cl.
CPC .................................... *H02H 11/00* (2013.01)

(58) Field of Classification Search
CPC ....... H02H 11/00; H05H 11/005; H05H 1/02; H05H 1/0283; H05H 1/0288; H05H 3/0052; H05H 3/009
USPC .......... 219/481, 494, 497, 501, 517, 519, 507
See application file for complete search history.

(56) References Cited

U.S. PATENT DOCUMENTS

| | | | |
|---|---|---|---|
| 3,943,325 A | 3/1976 | Pickard | |
| 4,029,937 A * | 6/1977 | Russell | F24H 1/106 219/497 |
| 4,730,220 A | 3/1988 | Wagner | |
| 4,762,980 A | 8/1988 | Insley | |
| 5,526,538 A * | 6/1996 | Rainwater | A61H 33/601 4/492 |
| 5,872,890 A | 2/1999 | La Combe | |
| 6,080,971 A * | 6/2000 | Seitz | F24H 9/2028 219/483 |
| 6,154,608 A | 11/2000 | Rochelle | |
| 6,591,063 B2 | 7/2003 | Rochelle | |
| 6,621,985 B1 | 9/2003 | Thweatt, Jr. | |
| 7,065,292 B2 | 6/2006 | Thweatt, Jr. | |
| 7,514,652 B2 | 4/2009 | Elnar | |
| 7,702,224 B2 | 4/2010 | Elnar | |
| 7,791,004 B2 | 9/2010 | Reusche et al. | |
| 8,014,653 B2 | 9/2011 | Elnar | |
| 8,406,932 B2 | 3/2013 | Hollaway | |
| 2003/0016952 A1 * | 1/2003 | Elphee | F22B 1/284 392/324 |
| 2005/0185942 A1 | 8/2005 | Fabrizio | |
| 2007/0210068 A1 | 9/2007 | Reusche et al. | |
| 2010/0021146 A1 * | 1/2010 | Murai | A21B 3/04 392/394 |

* cited by examiner

*Primary Examiner* — Mark Paschall
(74) *Attorney, Agent, or Firm* — Kenneth L. Green; Averill & Green

(57) ABSTRACT

Apparatus for electrical water heater air entrapment detection includes two electrodes residing at opposite ends of a heater housing. The electrodes are part of a circuit and if either electrode is surrounded by air, the circuit is opened and entrapped air is sensed. The temperature sensors are located at opposite ends of the heater housing, the electrodes may be integrated into the temperature sensors. When entrapped air is sensed, a heater relay is opened preventing powering a heater element(s). A spa pump is operated to clear the entrapped air, and when a variable speed pump is present, the pump is turned to high speed to clear the entrapped air.

11 Claims, 4 Drawing Sheets

ELECTRICAL WATER HEATER AIR ENTRAPMENT DETECTION

BACKGROUND OF THE INVENTION

The present invention relates to electric water heaters and in particular to detecting the presence of entrapped air which may cause a dry fire.

Portable spas often use electric spa water heaters. Such heaters include a heater element(s) intended to be completely immersed in water while the heater is operating. Unfortunately, in some instances air may become entrapped in the heater housing, and energizing the heater while air is entrapped in the heater housing results in overheating and possibly destroying the heater element. Because air has a much lower density then water, when the heater is energized while a portion of the heater element is exposed to air, air temperature will be increased rapidly in the heater housing at a rate of 1000 degrees per seconds. Such overheating is the most frequent cause of heater failure in hot tub applications.

The heater element comprises an inner wire separated from an outer tubular wall by insulating material, for example, Magnesium Oxide (MgO) insulating material. The outer tubular wall is generally connected to ground. A rapid increase of temperature of even a portion of the heater element destroys or damages the insulating material causing current leakage from the inner wire to the outer wall of the heater element and shorting to ground. The resulting failure is referred to as heater dry fire.

Many devices have been made trying to prevent heater dry fire by detecting to the present of fluid inside the heater housing. Examples of such devices include vacuum switch, pressure switch, flow switch, and temperature sensors which monitor the rapid increase of temperature in the heater housing. None of these devises have provided adequate protection to the heater element from dry fire.

Unfortunately, operation of a low speed pump may not provide sufficient water flow rate to push an air pocket through the heater housing and may only provide a flow below the air pocket. As a result, the air pocket may be entrapped against the highest interior surface in a heater housing. Vacuum and pressure sensors may fail to detect the air pocket because the fluid (a combination of water and air) inside the heater housing creates enough pressure or vacuum to close the pressure or vacuum sensors circuitry.

For example, as the low speed pump pumps water through the heater housing, the pump would create pressure inside the heater housing, even when air is entrapped inside the housing, where a pressure switch is mounted. Known pressure switches, at as low as 1.5 PSI, send a signal to a heater control circuit to activate the heater. The heater control circuit turns the heater "on", heating the water circulating through the heater. Entrapped air inside the heater housing is compressed resulting in uniform pressure in both the water and entrapped air. If the heater comes "on" when air is present inside the heater housing, the heater (i.e., the pressure switch) cannot distinguish between water pressure and air pressure, resulting in heater damage almost immediately, for example in less than 10 seconds, depending on heater wattage.

U.S. Pat. No. 8,406,932 to Hollaway discloses a heater including a sensor which monitors an abnormal rise in temperature in the heater housing. Unfortunately, this method is not be effective at all for many reasons:

1—The sensor(s) can only detect the rise in temperature after the heater is turned on. When the heater comes on with air trapped in the heater housing, the heater internal insulation is destroyed or damaged by the time the sensors detect the rapid rise in temperature and turn off the heater.

2.—The temperature sensors cannot distinguish between air and water temperature in the heater housing. They can only turn the heater "On" or "OFF". The electric heater can be heating air, water or a combination of air and water U.S. Pat. No. 7,791,004 to Reusche discloses temperature sensors and a fluid sensor attached to a water heating element insertable into a bucket of water. Unfortunately, the fluid sensor only detects the absence of water in a particular location and would fail to detect entrapped air residing against the ceiling of a water heater housing.

BRIEF SUMMARY OF THE INVENTION

The present invention addresses the above and other needs by providing apparatus for electrical water heater air entrapment detection which includes two electrodes residing at opposite ends of a heater housing. The electrodes are part of a circuit and if either electrode is surrounded by air, the circuit is opened and entrapped air is sensed. The temperature sensors are located at opposite ends of the heater housing, the electrodes may be integrated into the temperature sensors. When entrapped air is sensed, a heater relay is opened preventing powering a heater element(s). A spa pump is operated to clear the entrapped air, and when a variable speed pump is present, the pump is turned to high speed to clear the entrapped air.

In accordance with one aspect of the invention, there is provided an entrapped air detector which distinguishes between air and water. Air is an electric insulator however water is a conductor. The present invention is capable to distinguish between the two fluids. This new invention will protect the heater by not turning the heater "on" when air is present in the heater housing. The new invention will only turn the heater "on" if water is present in the heater housing. The current invention consists of measuring the presents of conductivity between the inlet and the outlet of the heater housing also known as heater manifold.

In accordance with another aspect of the invention, there is provided an entrapped air detector including a spa pump control circuit. When entrapped air is detected in the heater housing, the spa pump control circuit delays power to the heater element and turns a variable speed spa pump to high speed to clear the entrapped air.

In accordance with yet another aspect of the invention, there is provided a method for preventing damage to a spa heater due to entrapped air. The method includes monitoring a circuit including two electrodes residing at opposite ends of a heater interior, measuring the electrical resistance between the electrodes, and delaying providing power to a spa heater element if the measured resistance is above a threshold. The method may further include turning a spa pump to high speed if the measured resistance is above the threshold, and if the measured resistance is below the threshold for a period of time: providing power to the spa heater element; and turning the spa pump to low speed.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
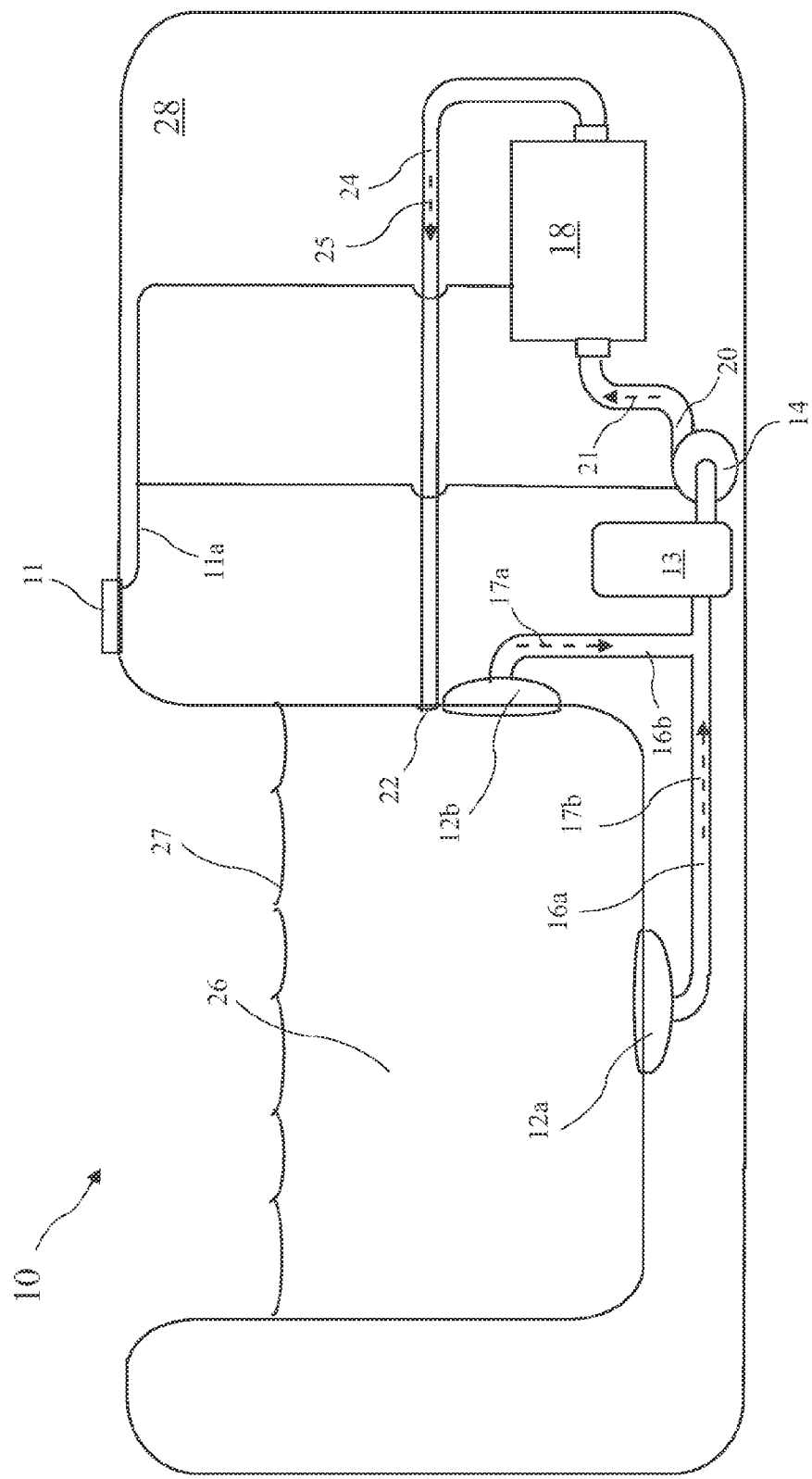
FIG. 1 is a spa including a spa heater unit according to the present invention.

A spa 10 is shown in FIG. 1. The spa 10 includes drains 12a and 12b. The drains 12a, 12b are in fluid communication with a pump 14 through first lines 16a and 16b carrying flows 17a and 17b respectively, through a filter 13 and to the pump 14. A spa heater unit 18 is in fluid communication with the pump 14 through a second line 20 carrying second flow 21. A spa-side control/display 11 is electrically connected to the spa heater 18 by control wires 11a for controlling the spa 10, or may be wirelessly connected to the spa heater unit 18. The control/display 11 generally includes user controls for controlling the mode of operation of the spa 10. The heater unit 18 is in fluid communication with at least one jet 22 through line 24 carrying a third flow 25. Water 26 is thereby circulated, filtered, and heated.

The pump 14 may be powered by a single speed motor at maximum 1725 rpm or a variable speed motor. The variable speed may be as low as 1000 rpm and as high as 5000 rpm. The low speed, 1000 rpm, is usually used to circulate the water from the drains 12a and 12b through the spa heater unit 18 to cool down the spa heater. Also, providing a flow of water through the spa heater using low speed saves electricity compared to providing a flow of water through the heater at high speed. Because time is required to increase the temperature of a typically 400 gallon hot tub regardless of pump speed, low speed may be used in order to save electricity.

Figure 2:
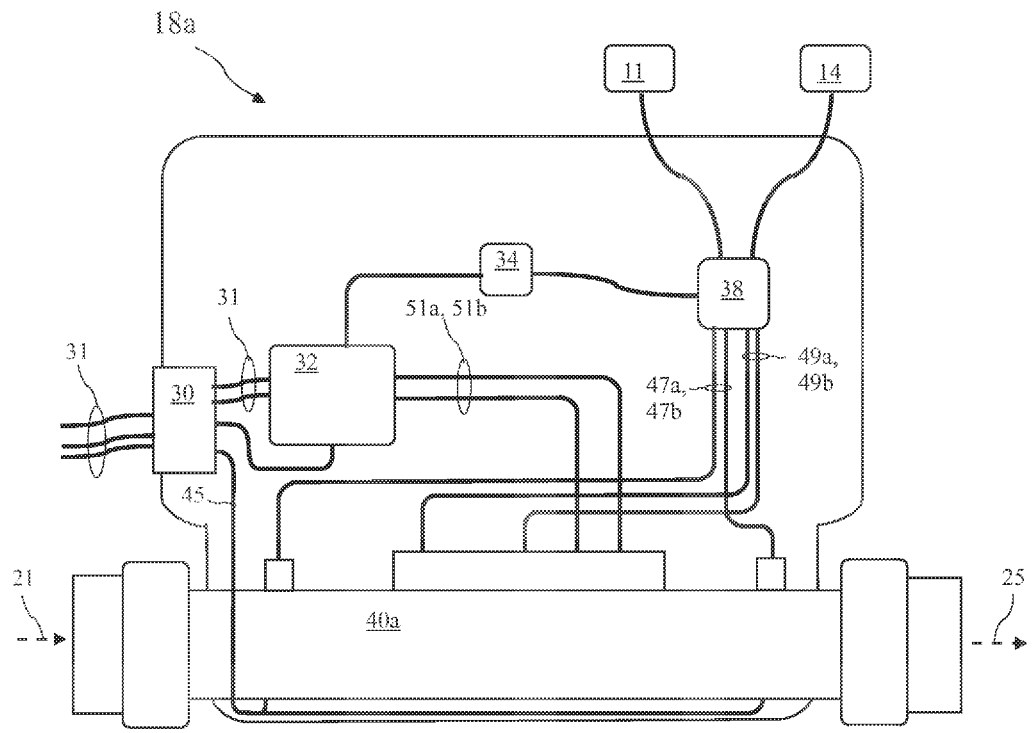
FIG. 2 depicts a side view of a first spa heater unit according to the present invention.
Figure 3:
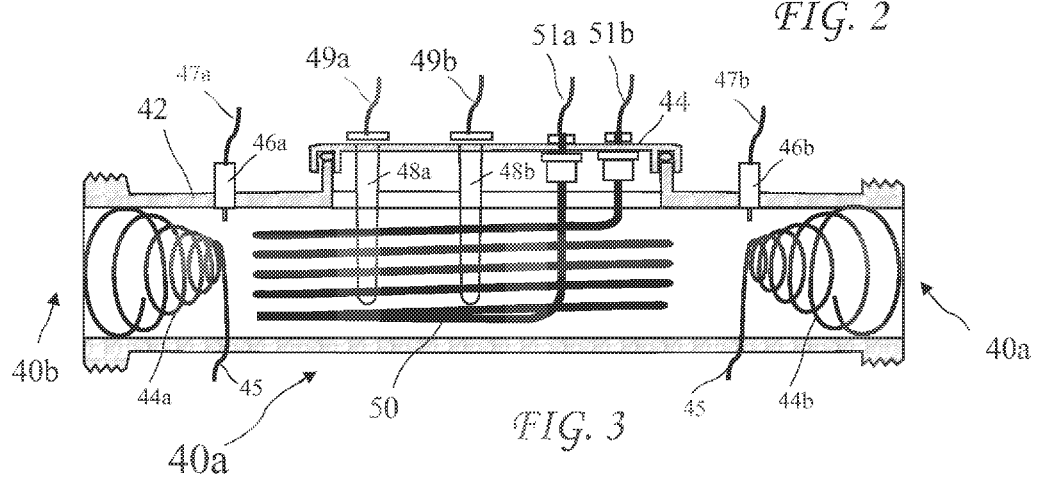
FIG. 3 is a cut-away view of a first spa heater of the spa heater unit according to the present invention.

A side view of a first spa heater unit 18a is shown in FIG. 2 and a cut-away view of a first spa heater 40a of the spa heater unit 18a. The spa heater unit includes a connection 30 receiving power through wires 31. The power may be 110 volt AC power or 220 volt AC power, but is preferably 220 volt AC power. Wires 31 carry power to a main power relay 32 which controls switched power through wires 51a and 51b to the spa heater 40a to energize the spa heater 40a. A neutral (e.g., ground) wire 45 runs from the connection 30 to current collectors 44a and 44b in the spa heater 40a.

A processor 38 is connected temperature sensors 48a and 48b by wires 49a and 49b to monitor the spa heater 40a for over temperature and electrodes 46a and 46b are connected to the processor 38 by wires 47a and 47b to monitor for entrapped air in the spa heater 40a. Continuity in a circuit including the electrodes 46a and 46b is monitored and if either electrode 46a or 46b is surrounded by entrapped air, high resistance between the electrode 46a or 46b will result. When the processor 38 detects the high resistance, a second relay 34 is actuated which opens the main power relay 32.

The spa pump 14 will come on and tends to clear the entrapped air from the spa heater 40a. The processor 38 continues to monitor the electrodes 46a and 46b and if sufficient continuity is measured between the electrodes 46a and 46b, power will be provided to the spa heater 40a. The processor 38 may also control the spa pump 14 speed when the spa pump is a variable speed pump, and turn the speed to high to help clear the entrapped air from the spa heater 40a.

The processor 38 is further electrically connected to the spa-side control/display 11 and the spa pump 14. When the processor 38 detected entrapped air in the heater housing 50, and message may be displayed on the spa-side control/display 11 informing a user that the spa heater 40a should be purged of entrapped air. The processor 38 may also be connected to the spa pump 14 to turn the spa pump to high speed to clear the heater housing 50 of entrapped air when the spa pump is a variable speed pump, and to turn the spa pump 14 back to low speed after the entrapped air has been cleared from the housing 50. The housing 30 is preferably made from a non-electrically conductive material, and more preferably made from a plastic material.

Figure 4:
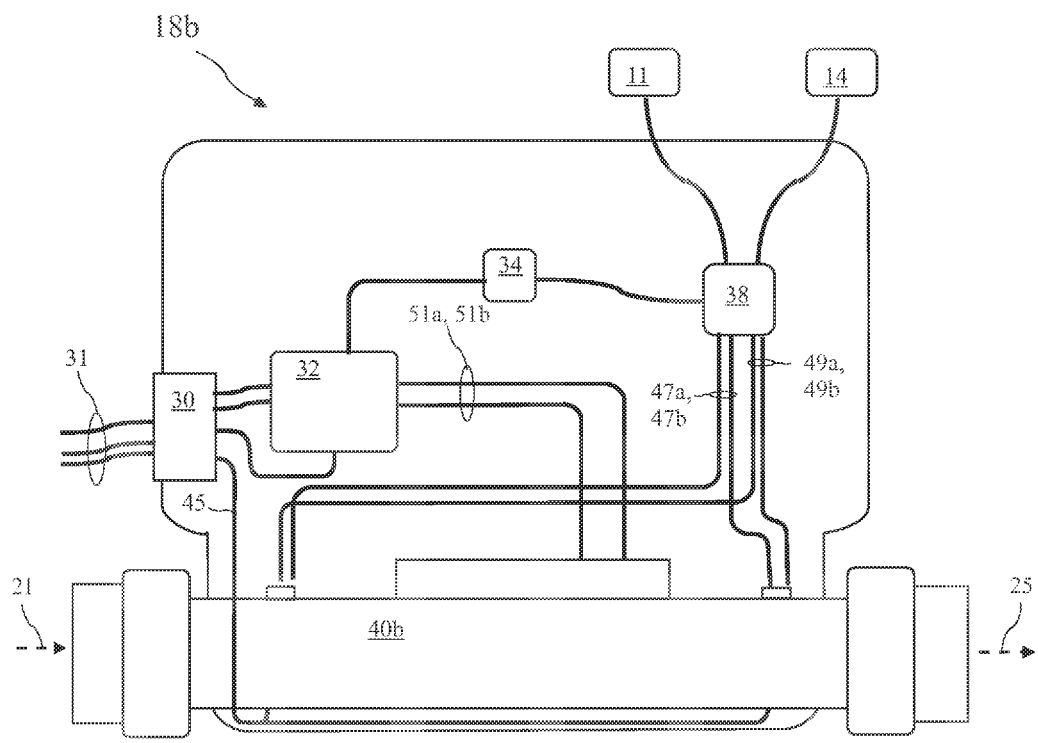
FIG. 4 depicts a side view of a second spa heater unit according to the present invention.
Figure 5:
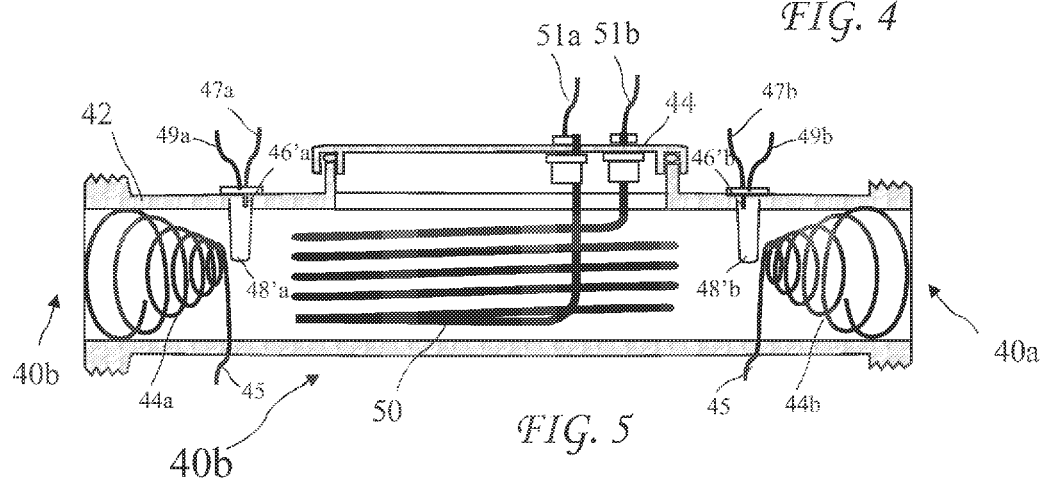
FIG. 5 is a cut-away view of a second spa heater of the spa heater unit according to the present invention.

A side view of a second spa heater unit 18b according to the present invention is shown in FIG. 4 and a cut-away view of a second spa heater 40b of the spa heater unit 18b is shown in FIG. 5. The second spa heater unit 18b and second spa heater 40b are similar to the first spa heater unit 18a and first spa heater 40a, with the exception that the second spa heater 40b includes temperature sensors 48'a and 48'b which are moved to opposite ends of the heater housing 42 and include electrodes 46'a and 46'b.

Figure 6:
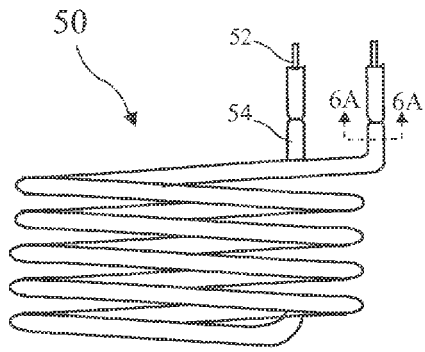
FIG. 6 is a heater element of the spa heater according to the present invention.
Figure 6A:
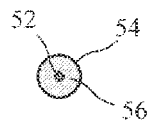
FIG. 6A is a cross-sectional view of the heater element taken along line 6A-6A of FIG. 6 according to the present invention.

The heater element 50 is shown in FIG. 6 and a cross-sectional view of the heater element 50 taken along line 6A-6A of FIG. 6 is shown in FIG. 6A. The heater element 50 comprises an inner wire 52a separated from an outer wall by insulating material 54, for example, Magnesium Oxide (MgO) insulating material. When even a small portion of the heater element 50 is exposed to entrapped air when receiving power, the temperature of the exposed portion rises very quickly and damage to the heater element 50 results.

Figure 7:
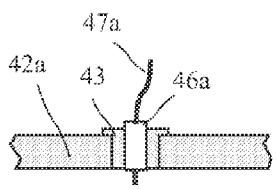
FIG. 7 shows a metal heater housing and an insulated electrode accord according to the present invention.

FIG. 7 shows a portion of a metal (or any electrically conductive) heater housing 42a. Because the heater housing 42a itself is electrically conductive, at least one of the electrode 47a and 47b, and preferably both electrode 47a and 47b, are mounted using electrical insulators 43.

Figure 8:
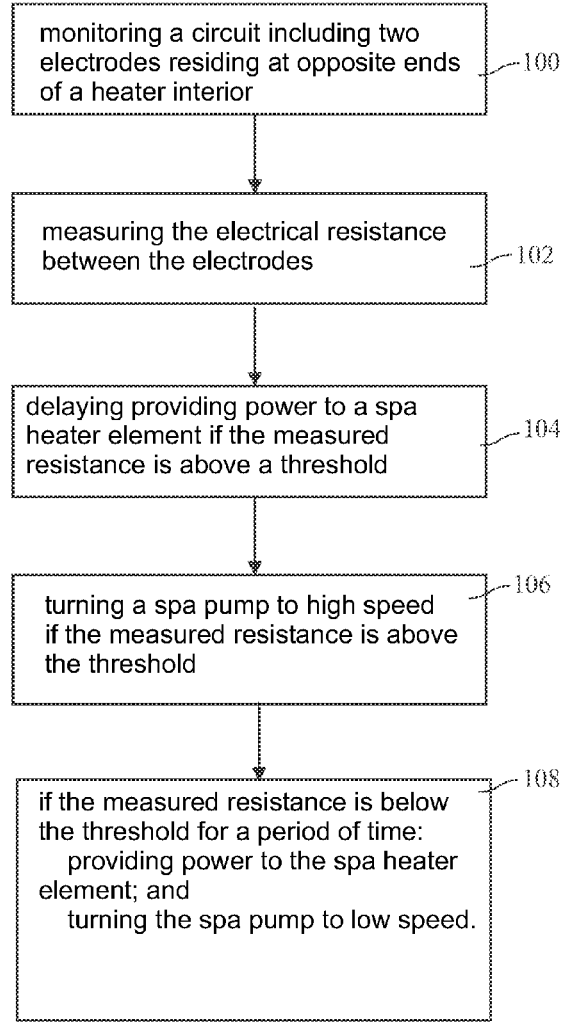
FIG. 8 shows a method according to the present invention.

FIG. 8 shows a method according to the present invention. The method includes monitoring a circuit including two electrodes residing at opposite ends of a heater interior at step 100, measuring the electrical resistance between the electrodes at step 102, and delaying providing power to a spa heater element if the measured resistance is above a threshold at step 104. The method may further include turning a spa pump to high speed if the measured resistance is above the threshold at step 106, and if the measured resistance is below the threshold for a period of time: turning the spa pump to low speed; and providing power to the spa heater element at step 108. If after turning the spa pump to low speed, the measured resistance increases to above the threshold, power to the spa heater element will continue to be delayed and the spa pump will be returned to high speed.

While the invention herein disclosed has been described by means of specific embodiments and applications thereof, numerous modifications and variations could be made thereto by those skilled in the art without departing from the scope of the invention set forth in the claims.

I claim:

1. Apparatus for detection of entrapped air in an electric water heater, the apparatus comprising:
    a spa heater housing having an inlet at a first end and an outlet at a second end opposite to the first end, the second end horizontally separated from the first end to create a generally horizontal flow of water through the spa heater housing;
    a first electrode residing in the spa heater housing proximal to the first end of the housing and extending into an interior of the spa heater housing into intimate contact with the flow of water through the housing;
    a second electrode residing in the spa heater housing proximal to the second end of the housing and extending into the interior of the spa heater housing into intimate contact with the flow of water through the housing;
    an entrapped air monitoring circuit including the first and second electrodes, a power source, and a processor, the power source electrically connected to the first and second electrodes creating an electrode circuit closed by a presence of a continuous flow of water between the first and second electrodes and opened by an absence of the continuous flow of water between the first and second electrodes when air is entrapped in the spa heater housing;
    a main power relay electrically connected between the power source and a spa heater element;
    the processor is electrically connected to monitor the electrode circuit and to control the main power relay, wherein:
        the main power relay is open and the spa heater element is off when the processor detects the electrode circuit open due to a presence of entrapped air in the spa heater housing; and
        the main power relay is closed and the spa heater element is on when the processor detects the electrode circuit closed due to an absence of entrapped air in the spa heater housing.

2. The apparatus of claim 1, further including a display electrically connected to the processor and displaying an entrapped air warning to a user when the processor detects entrapped air in the spa heater housing.

3. The apparatus of claim 1, further including communications between the processor and a spa pump, the communications including:
    a first pump control signal sent from the processor to the spa pump to command the spa pump to go to high speed if the electrode circuit is open.

4. The apparatus of claim 1, wherein the electrodes are attached directly to the spa heater housing.

5. The apparatus of claim 1, wherein at least one of the electrodes is attached to the spa heater housing by an electrical insulator preventing contact between the electrode and the heater housing.

6. The apparatus of claim 2, wherein both of the electrodes are attached to the spa heater housing by the electrical insulators preventing contact between the electrodes and the heater housing.

7. The apparatus of claim 1, wherein the electrodes are included in temperature sensors attached to the spa heater housing.

8. A method for preventing damage to a spa heater due to entrapped air, the method comprising:
    orienting the spa heater to provide a generally horizontal flow of water through the spa heater;
    monitoring a circuit including two electrodes residing at opposite ends of a heater interior;
    measuring the electrical resistance between the electrodes; and
    delaying providing power to a spa heater element if the measured resistance is above a threshold.

9. The method of claim 8, further including:
    turning a spa pump to high speed if the measured resistance is above the threshold; and
    if the measured resistance is below the threshold for a period of time:
        providing power to the spa heater element; and
        turning the spa pump to low speed.

10. The apparatus of claim 3, further including, if the electrode circuit is closed for a period of time:
    a relay signal from the processor to main power relay to provide power to the spa heater element; and
    a second pump control signal sent from the processor to the spa pump to command the spa pump to go to low speed.

11. The apparatus of claim 1, wherein the first electrode resides after a first current collector and before the spa heater element and the second electrode resides between the spa heater element and a second current collector.

* * * * *